(12) United States Patent
Wang et al.

(10) Patent No.: US 8,150,901 B2
(45) Date of Patent: Apr. 3, 2012

(54) INTEGRATED CONVERSION METHOD AND APPARATUS

(75) Inventors: Yi-Jung Wang, Hsinchu (TW); Guo-Zua Wu, Taichung (TW); Chih-Chi Chang, Hsinchu (TW); Oscal Tzyh Chiang Chen, Chiayi County (TW)

(73) Assignee: Industrial Technology Research Institute, Hsinchu (TW)

( * ) Notice: Subject to any disclaimer, the term of this patent is extended or adjusted under 35 U.S.C. 154(b) by 1221 days.

(21) Appl. No.: 11/845,003

(22) Filed: Aug. 24, 2007

(65) Prior Publication Data

US 2008/0104161 A1    May 1, 2008

(30) Foreign Application Priority Data

Oct. 25, 2006 (TW) ................................ 95139321 A (51) Int. Cl.
*G06F 17/14* (2006.01)
(52) U.S. Cl. ...................................................... 708/401
(58) Field of Classification Search .................. None
See application file for complete search history.

(56) References Cited

U.S. PATENT DOCUMENTS

| | | | |
|---|---|---|---|
| 4,868,776 A * | 9/1989 | Gray et al. | 708/405 |
| 5,550,765 A * | 8/1996 | Bhattacharya et al. | 708/401 |
| 5,815,421 A | 9/1998 | Dulong et al. | |
| 5,953,241 A | 9/1999 | Hansen et al. | |
| 6,477,554 B1 * | 11/2002 | Aizenberg et al. | 708/404 |
| 6,549,925 B1 * | 4/2003 | Amrany et al. | 708/404 |
| 6,584,482 B1 | 6/2003 | Hansen et al. | |
| 7,007,055 B2 * | 2/2006 | Zheltov et al. | 708/402 |
| 2003/0023652 A1 * | 1/2003 | Aizenberg et al. | 708/404 |
| 2003/0177158 A1 * | 9/2003 | Zheltov et al. | 708/402 |
| 2004/0117418 A1 * | 6/2004 | Vainsencher et al. | 708/402 |

FOREIGN PATENT DOCUMENTS

| | | |
|---|---|---|
| TW | 343310 | 10/1998 |
| TW | 485734 | 5/2002 |
| TW | I243332 | 11/2005 |

OTHER PUBLICATIONS

Taiwan Patent Office, Office Action—Notice of Allowance, Patent Application Serial No. 095139321, Apr. 14, 2011, Taiwan.

* cited by examiner

*Primary Examiner* — David H Malzahn (57) ABSTRACT

An integrated transformation apparatus is provided. The apparatus includes a first multiplexer, a second multiplexer, and a transformation unit. The first multiplexer retrieves point data from columns or rows of a multi-dimensional matrix and input data. The second multiplexer retrieves transformation coefficients corresponding to the point data. The transformation unit transforms data blocks of the multi-dimensional matrix to a plurality of sub data blocks according to the input data, the point data, and the transformation coefficients.

20 Claims, 13 Drawing Sheets

INTEGRATED CONVERSION METHOD AND APPARATUS

BACKGROUND OF THE INVENTION

1. Field of the Invention

The invention relates to an integrated conversion method and apparatus, and more particularly to a data conversion method for video or audio data, converting different data block sizes for video or audio data using the same designed hardware architecture.

2. Description of the Related Art

With respect to dynamic data compression, a memory can be divided to multiple 16×16 blocks, referred to as macroblocks. Each macroblock can be divided into 4 blocks, each serving as a basic unit for compression Implementation of one-dimensional or multi-dimensional conversion of data blocks requires different hardware architecture designs. With respect to 8×4 and 8×8-block conversion, for example, 8×1-block one-dimensional inverse conversion and 4×1-block one-dimensional inverse conversion are implemented using different hardware architecture designs. Different hardware architecture designs convert different block sizes, for example, common operations units. Further, conversion is achieved with only one block size in a period while other block size conversion operations are idle, thus, hardware design resources are wasted.

Thus, the invention provides an integrated conversion method and apparatus, integrating common operation units to achieve conversions with different block sizes using the same hardware architecture.

BRIEF SUMMARY OF THE INVENTION

Integrated conversion methods are provided. An exemplary embodiment of an integrated conversion method comprises the following. Row or column point data of a multi-dimensional matrix is obtained. Input data and conversion coefficients corresponding on the point data are obtained. Data blocks of the multi-dimensional matrix are converted to a plurality of sub data blocks according on the input data, and conversion coefficients, and the point data and a conversion operation is performed.

The input data is obtained using a multiplexer and transmitted to a conversion unit. Column conversion with M-point or N-point is implemented on the input data using the conversion unit. The column conversion data is temporarily stored in an output buffer. The row conversion data is accessed from the output buffer and row conversion with M-point or N-point is implemented on the row conversion data using the conversion unit. The row conversion data is stored in the output buffer for data output.

Integrated conversion apparatus are provided. An exemplary embodiment of an integrated conversion apparatus comprises a first multiplexer, a second multiplexer, and a conversion unit. The first multiplexer obtains row or column point data of a multi-dimensional matrix and input data. The second multiplexer obtains conversion coefficients corresponding on the point data. The conversion unit converts data blocks of the multi-dimensional matrix to a plurality of sub data blocks according on the input data, and conversion coefficients, and the point data and performs a conversion operation.

A detailed description is given in the following embodiments with reference to the accompanying drawings.

BRIEF DESCRIPTION OF THE DRAWINGS

The invention can be more fully understood by reading the subsequent detailed description and examples with references made to the accompanying drawings, wherein.

DETAILED DESCRIPTION OF THE INVENTION

Several exemplary embodiments of the invention are described with reference to FIGS. 1 through 12, which generally relate to data conversion. It is to be understood that the following disclosure provides various different embodiments as examples for implementing different features of the invention. Specific examples of components and arrangements are described in the following to simplify the present disclosure. These are, of course, merely examples and are not intended to be limiting. In addition, the present disclosure may repeat reference numerals and/or letters in the various examples. This repetition is for the purpose of simplicity and clarity and does not in itself dictate a relationship between the various described embodiments and/or configurations.

The invention discloses an integrated conversion method and apparatus, converting different data block sizes for video or audio data using the same hardware architecture design.

An embodiment of an integrated conversion method and apparatus provides one-dimensional or multi-dimensional conversion methods, comprising Fast Fourier Transform (FFT) and Discrete Cosine Transform (DCT), to convert $a_1 \times a_2 \times \ldots \times a_n$ data blocks to multiple $b_1 \times b_2 \times \ldots \times b_n$ data blocks, where $a_i$ is a multiplier of bi, $1 \leq i \leq n$, and n is a dimensional value. Thus, conversion of small block sizes can be implemented using an originally designed conversion architecture based on selected paths and conversion coefficients, maximally reducing hardware cost.

The apparatus further comprises an output buffer. The first multiplexer obtains and transmits the input data on the conversion unit. The conversion unit implements column conversion with M-point or N-point on the input data, temporarily stores the column conversion data in the output buffer, accesses the row conversion data from the output buffer, implements row conversion with M-point or N-point on the row conversion data, and stores the row conversion data in the output buffer for data output.

Generally, two-dimensional conversion architecture can be implemented using one-dimensional architecture.

Figure 1:
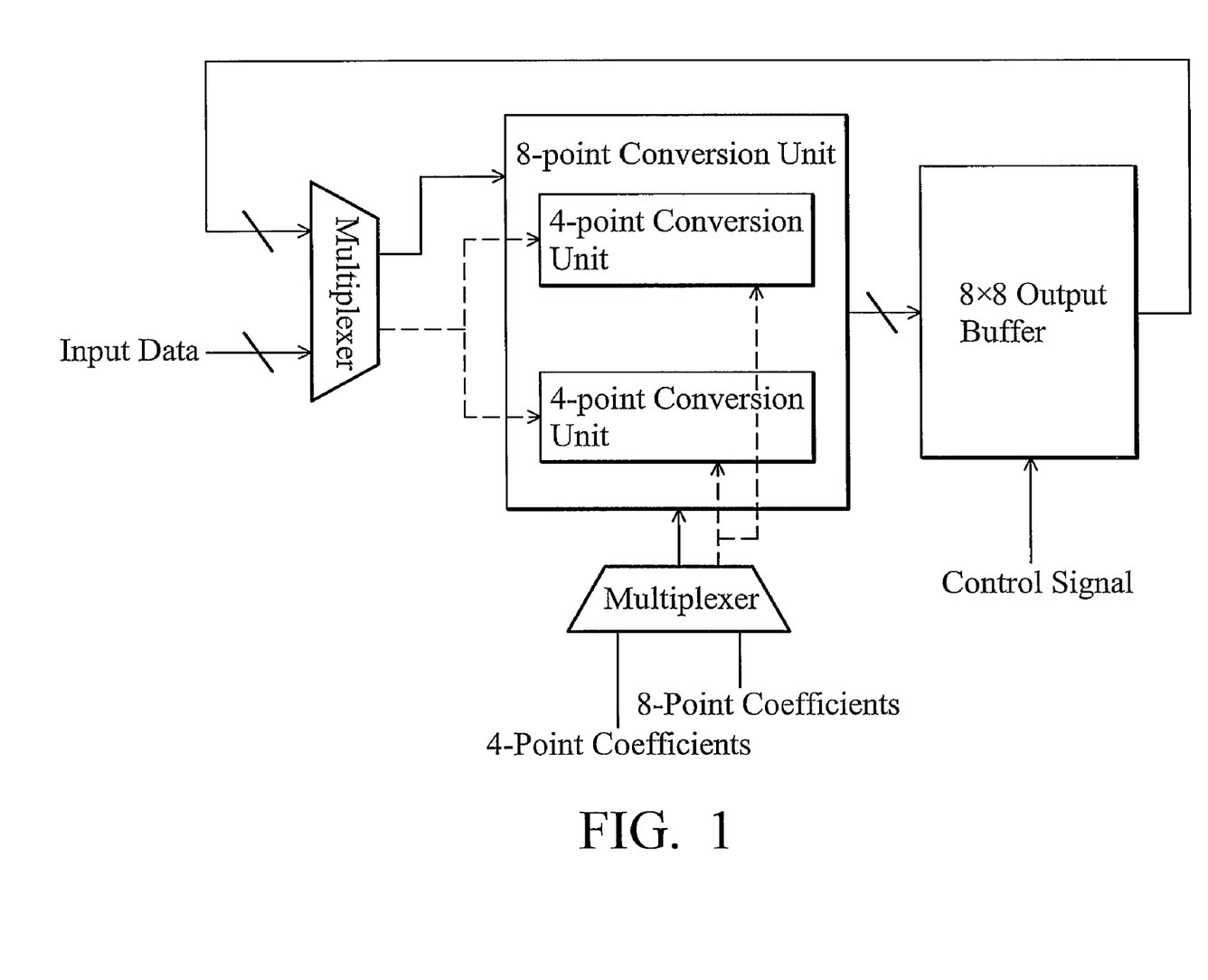
FIG. 1 is a schematic view of an embodiment of an integrated conversion apparatus.

FIG. 1 is a schematic view of an embodiment of an integrated conversion apparatus. Integrated conversion apparatus 100 comprises an 8-point conversion unit 110, an 8×8-point output buffer 120, and multiplexers 130 and 140. 8-point conversion unit 110 further comprises 4-point conversion unit 111 and 112.

When two-dimensional conversion is implemented, 8-point conversion unit 110 implements 8-point one-dimensional column conversion to input data or 4-point conversion units 111 and 112 implements 4-point one-dimensional column conversion to the input data. The column converted data is temporarily stored in output buffer 120. Next, 8-point conversion unit 110 or 4-point conversion unit 111 and 112 access the converted data from output buffer 120 and implement 8-point or 4-point one-dimensional row conversion. The row converted data is stored in output buffer 120 for output. Additionally, the selection of reading, writing, and conversion coefficients are implemented using multiplexers 130 and 140. Thus, a two-dimensional conversion architecture is implemented using a one-dimensional architecture.

Figure 4:
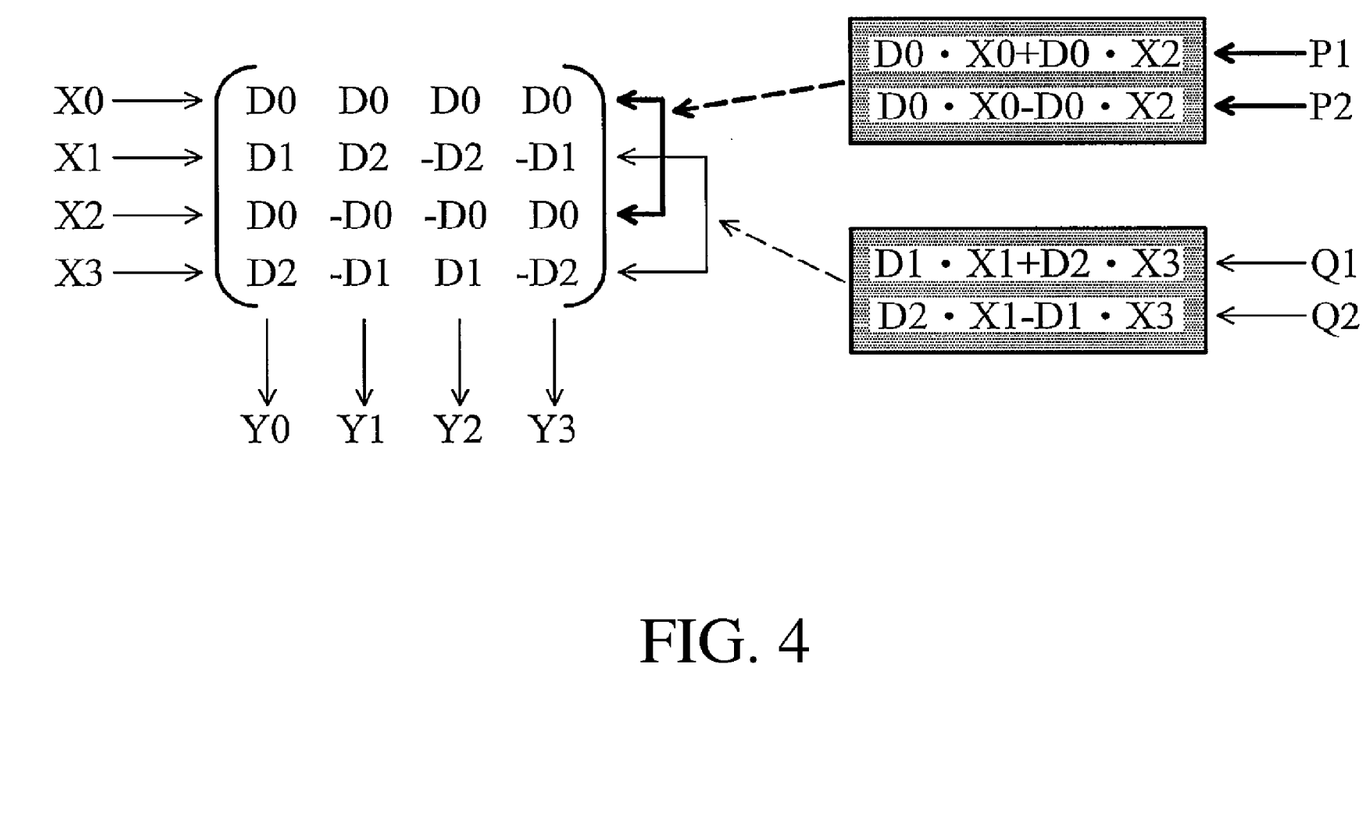
FIG. 4 is a schematic view of common items generated from multiplication of a 4-point conversion coefficient matrix by input data.

FIG. 4 illustrates common items generated from multiplication of a 4-point conversion coefficient matrix by input data. As shown in FIG. 4, $X_0 \sim X_3$ indicate input data for one-dimensional conversion and are multiplied by the 4-point conversion coefficient matrix to generate "$D_0 \cdot X_0 + D_0 \cdot X_2 = P_1$", "$D_0 \cdot X_0 - D_0 \cdot X_2 = P_2$", "$D_1 \cdot X_1 + D_2 \cdot X_3 = Q_1$", and "$D_2 \cdot X_1 - D_1 \cdot X_3 = Q_2$".

Figure 5:
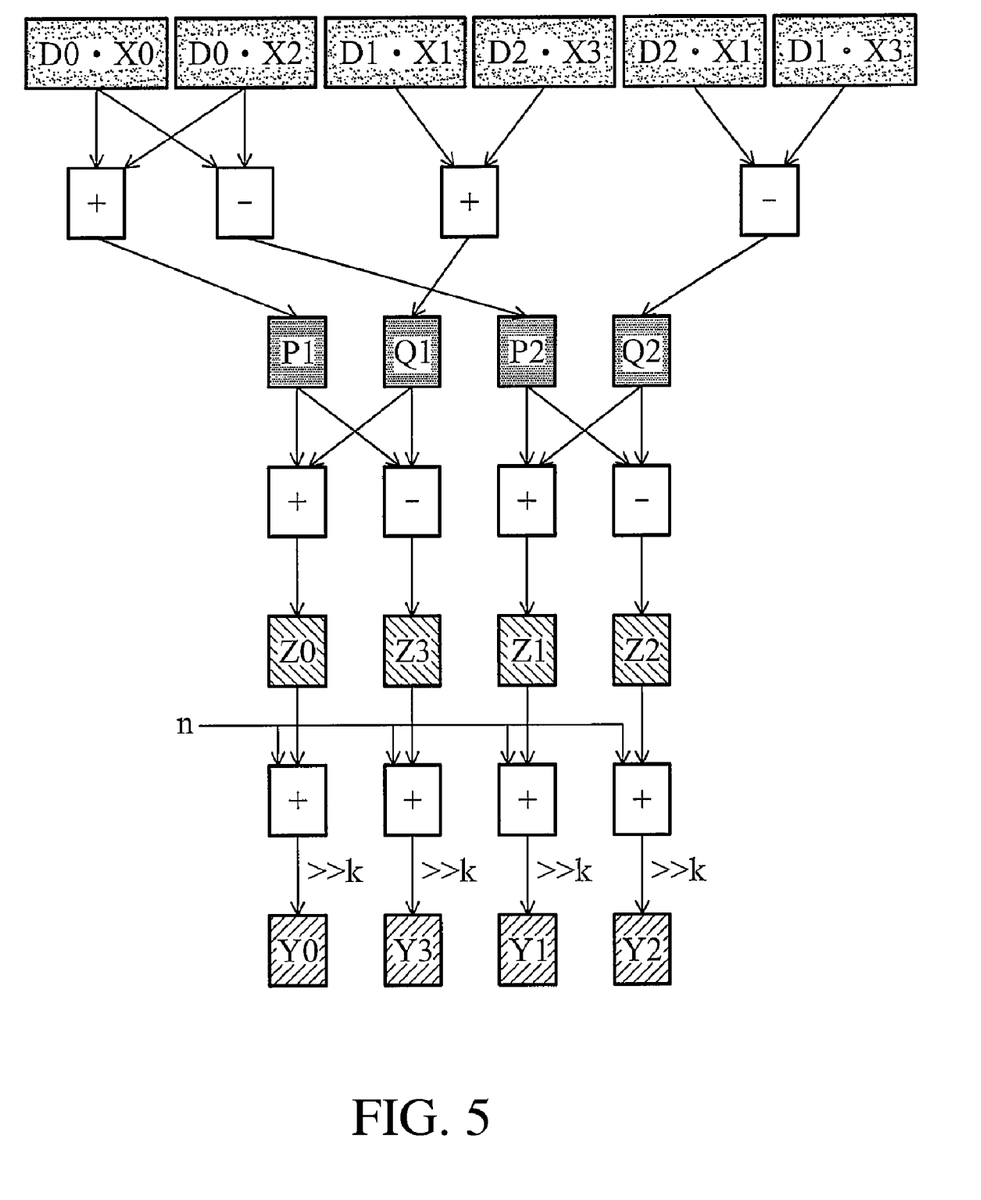
FIG. 5 is a schematic view of a parallel architecture of 4-point one-dimensional conversion shown in FIG. 4.
Figure 6:
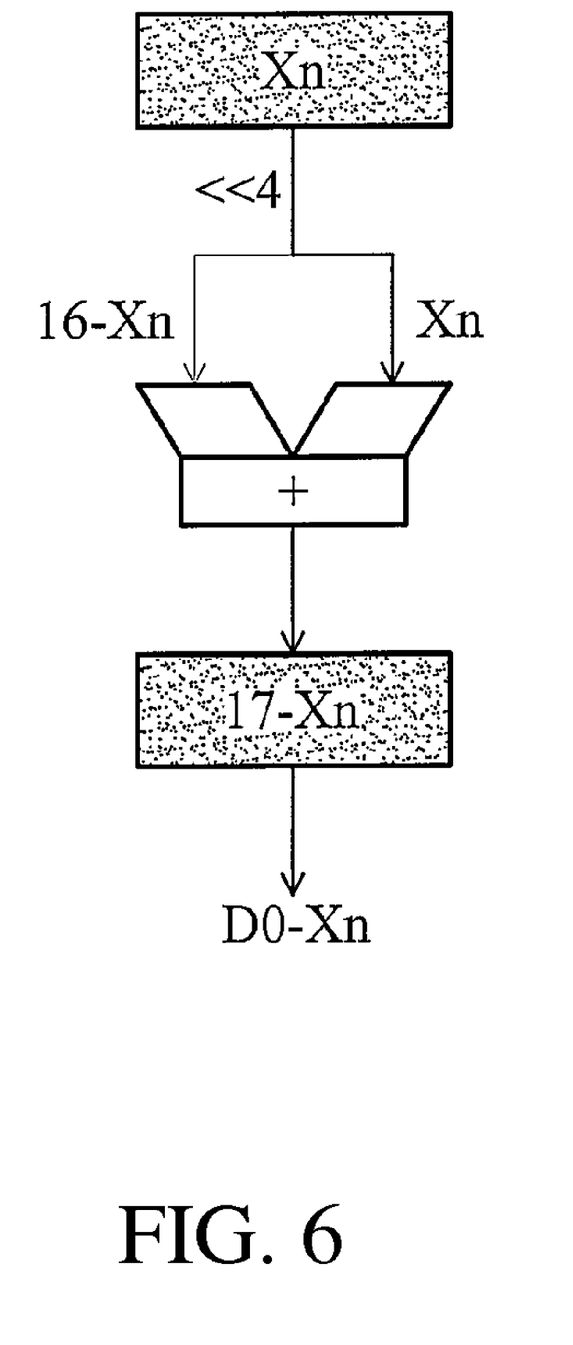
FIG. 6 is a schematic view of a structure of $D0 \cdot X_n$.
Figure 7:
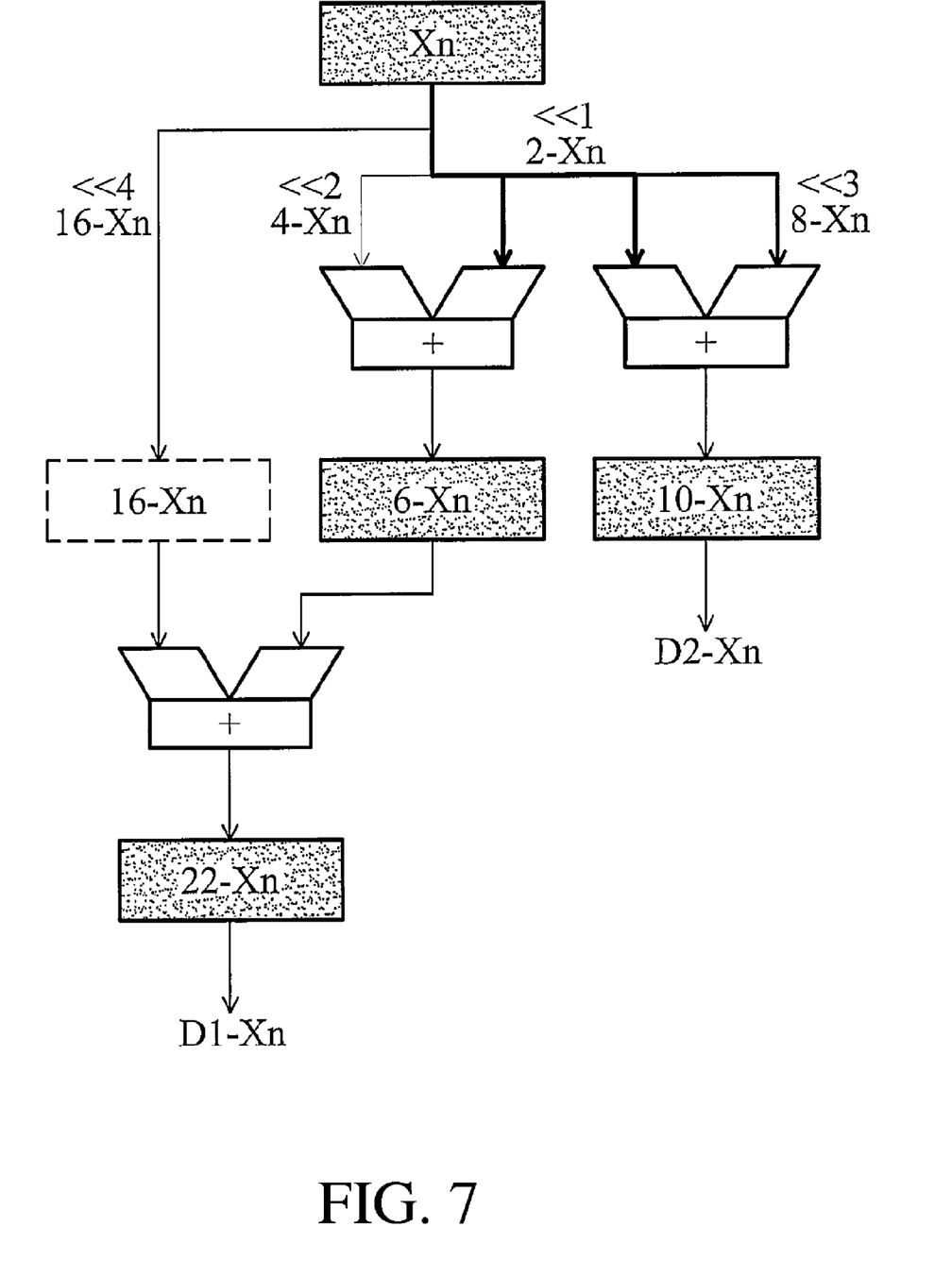
FIG. 7 is a schematic view of a structure of $D_1 \cdot X_1$ and $D_2 \cdot X_3$.

FIG. 5 illustrates a parallel architecture of 4-point one-dimensional conversion shown in FIG. 4. As shown in FIG. 5, $Z_0$, $Z_1$, $Z_2$, and $Z_3$ are calculated by "$Z_0 = P_1 + Q_1$", "$Z_1 = P_2 + Q_2$", "$Z_2 = P_2 - Q_2$", and "$Z_3 = P_1 - Q_1$" and further operated with $Y_0, Y_1, Y_2$, and $Y_3$. Additionally, the result of "$D_0 \cdot X_n$", "$D_1 \cdot X_n$", and "$D_2 \cdot X_n$" (where $0 \leq n \leq 3$) can be calculated using architectures shown in FIGS. 6 and 7.

Figure 8:
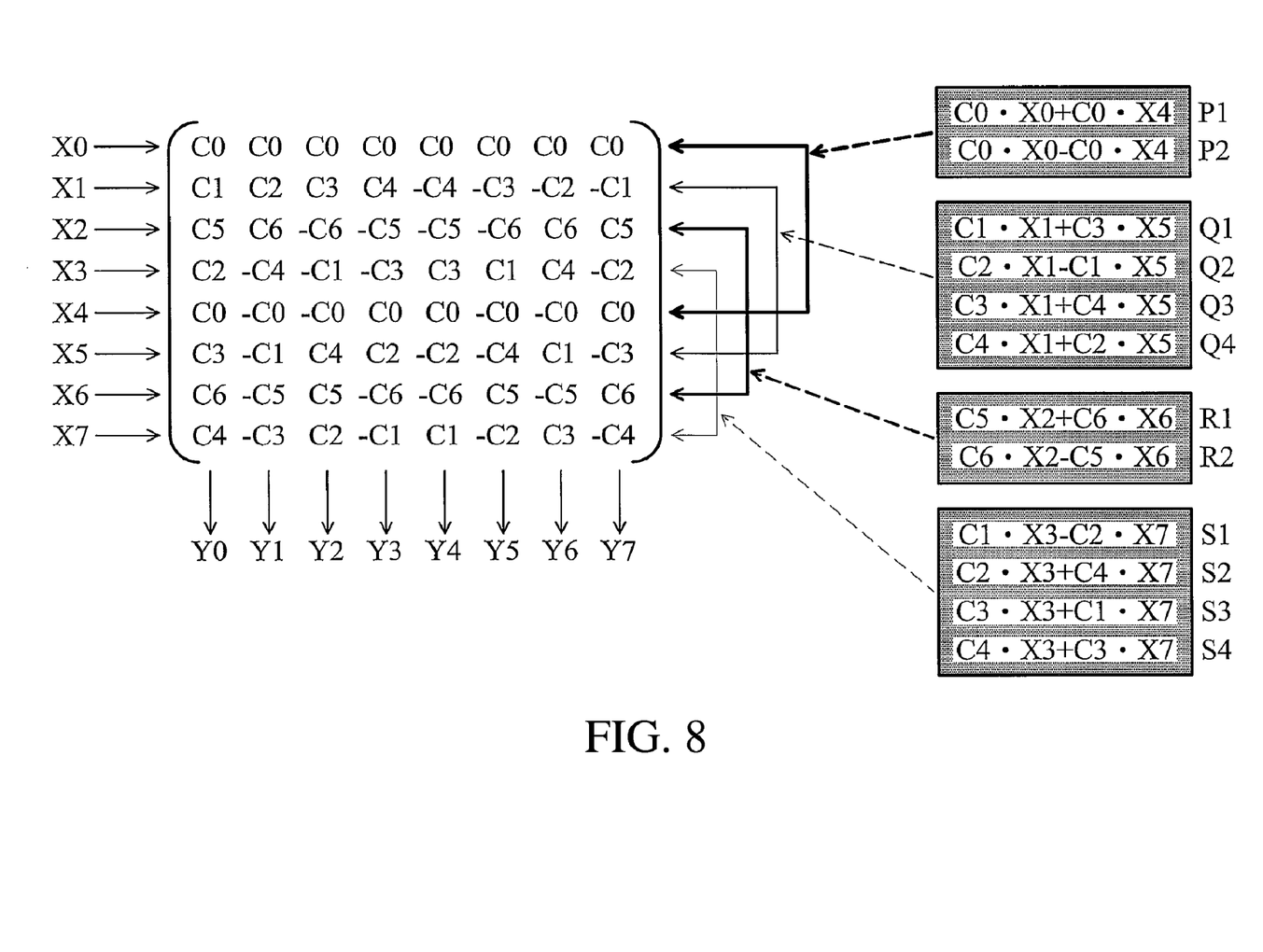
FIG. 8 is a schematic view of common items generated from multiplication of a 8-point conversion coefficient matrix by input data.

FIG. 8 illustrates common items generated from multiplication of an 8-point conversion coefficient matrix by input data. As shown in FIG. 8, $X_0 \sim X_7$ indicate input data for one-dimensional conversion and are multiplied by the 4-point conversion coefficient matrix, results represented as:

$$P_1 = C_0 \cdot X_0 + C_0 \cdot X_4 \quad \text{Equation (1);}$$

$$P_2 = C_0 \cdot X_0 + C_0 \cdot X_4 \quad \text{Equation (2);}$$

$$R_1 = C_5 \cdot X_2 + C_6 \cdot X_6 \quad \text{Equation (3);}$$

$$R_2 = C_6 \cdot X_2 + C_5 \cdot X_6 \quad \text{Equation (4);}$$

$$Q_1 = C_1 \cdot X_1 + C_3 \cdot X_5 \quad \text{Equation (5);}$$

$$Q_2 = C_2 \cdot X_1 + C_1 \cdot X_5 \quad \text{Equation (6);}$$

$$Q_3 = C_3 \cdot X_1 + C_4 \cdot X_5 \quad \text{Equation (7);}$$

$$Q_4 = C_4 \cdot X_1 + C_2 \cdot X_5 \quad \text{Equation (8);}$$

$$S_1 = C_1 \cdot X_3 + C_2 \cdot X_7 \quad \text{Equation (9);}$$

$$S_2 = C_2 \cdot X_3 + C_4 \cdot X_7 \quad \text{Equation (10);}$$

$$S_3 = C_3 \cdot X_3 + C_1 \cdot X_7 \quad \text{Equation (11); and}$$

$$S_4 = C_4 \cdot X_3 + C_3 \cdot X_7 \quad \text{Equation (12).}$$

$P_1$, $P_2$, $R_1$, $R_2$, $Q_1$, $Q_2$, $Q_3$, $Q_4$, $S_1$, $S_2$, $S_3$, and $S_4$ are composed of operation units comprising $C_0 \cdot X_n \sim C_6 \cdot X_n$ (where $0 \leq n \leq 7$) and are represented by equations (1)~(12).

Figure 9:
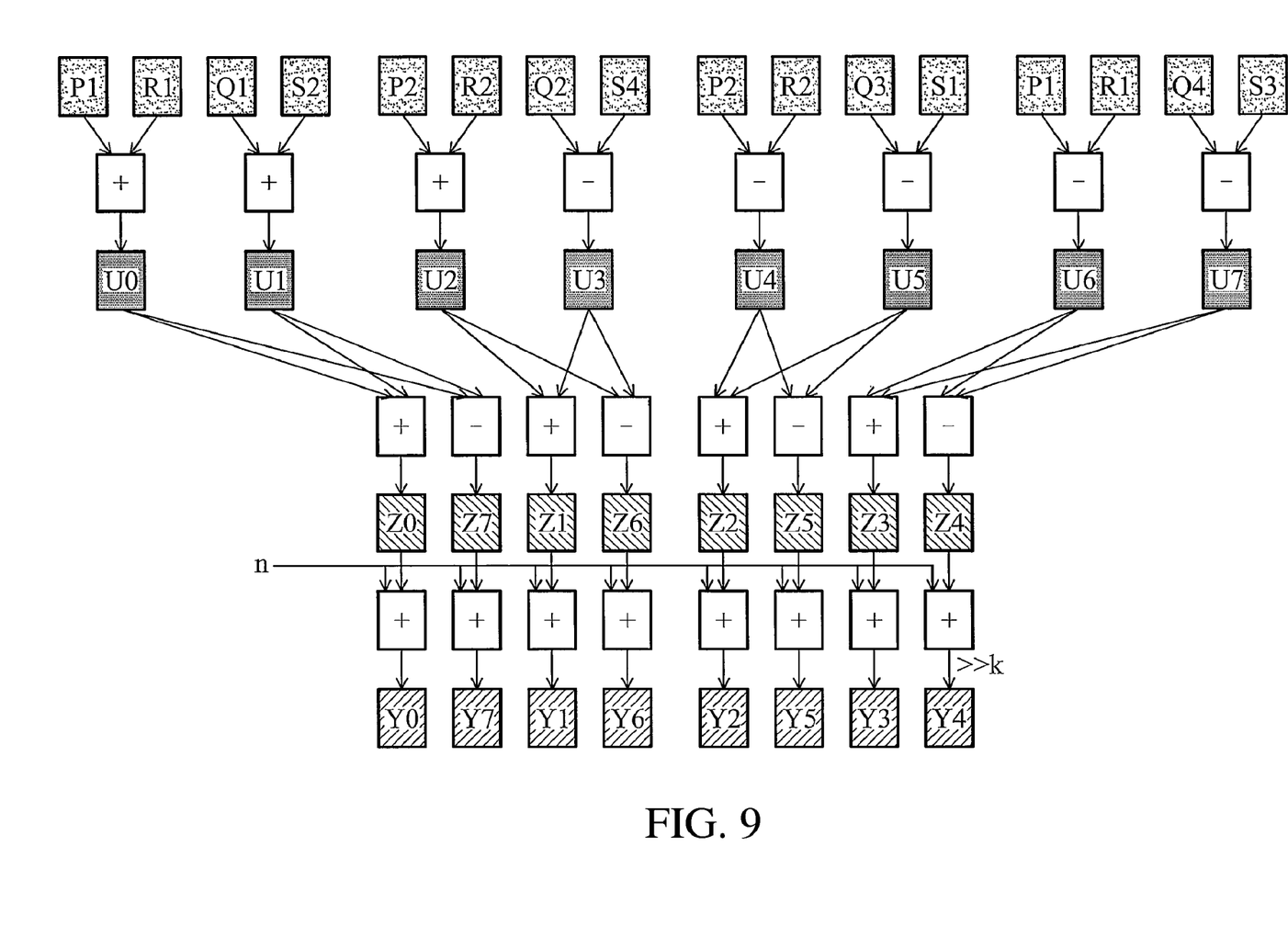
FIG. 9 is a schematic view of a parallel architecture of 8-point one-dimensional conversion shown in FIG. 8.
Figure 10:
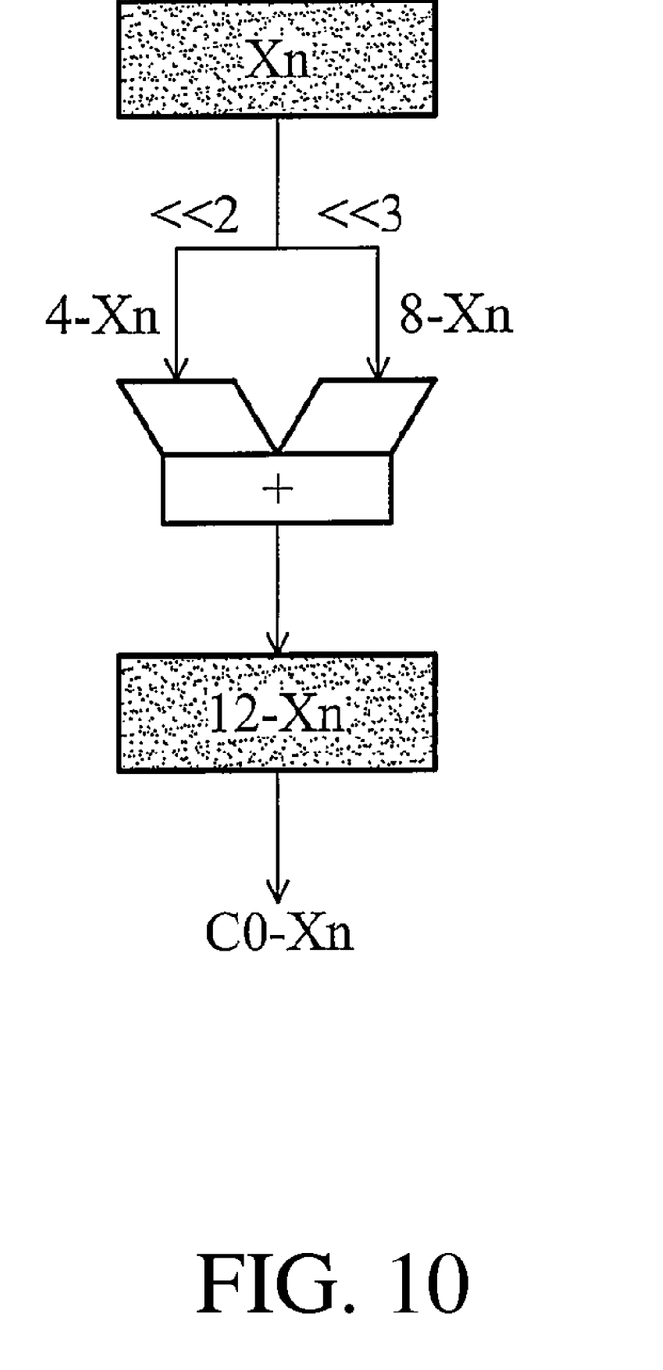
FIG. 10 is a schematic view of a structure of $C0 \cdot X_n$.
Figure 11:
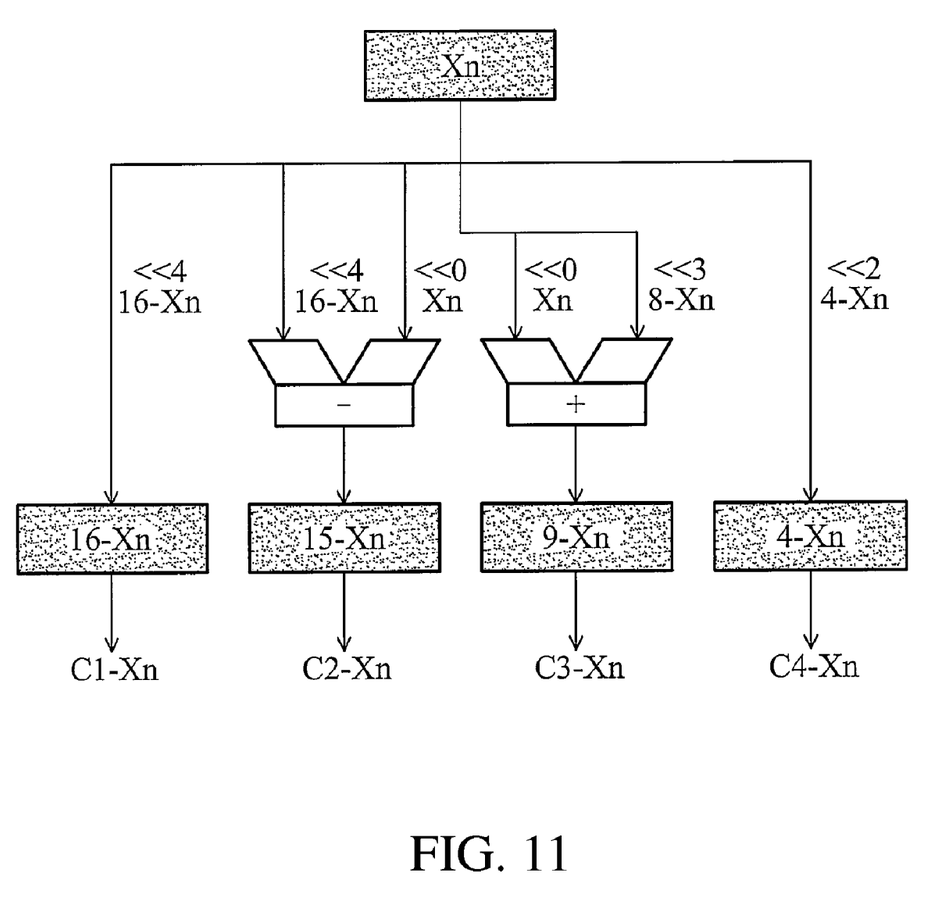
FIG. 11 is a schematic view of a structure of $C1 \cdot X_n \sim C4 \cdot X_n$.
Figure 12:
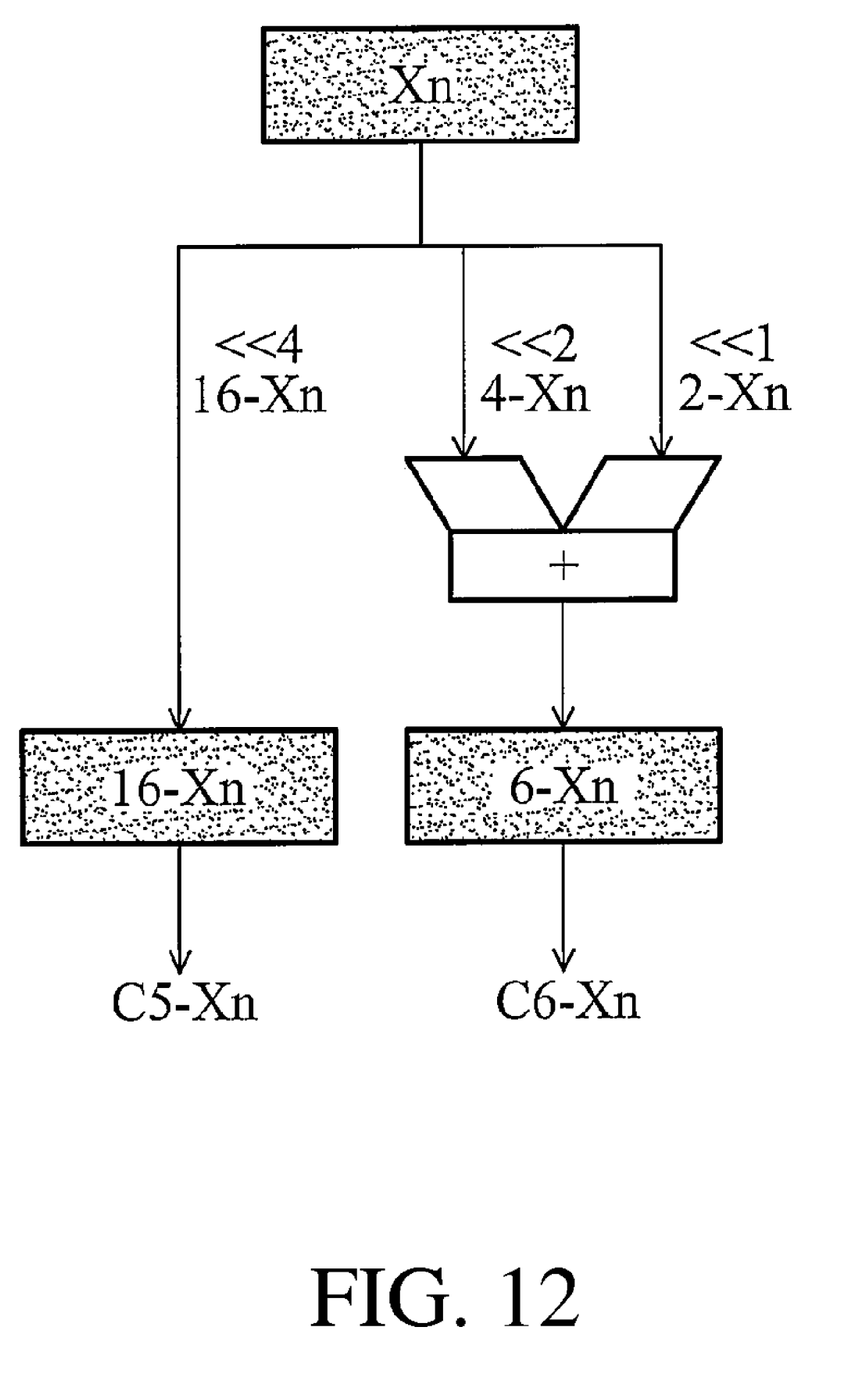
FIG. 12 is a schematic view of a structure of $C5 \cdot X_n$ and $C6 \cdot X_n$.

FIG. 9 illustrates a parallel architecture of 8-point one-dimensional conversion shown in FIG. 8. As shown in FIG. 9, $P_1, P_2, R_1, R_2, Q_1, Q_2, Q_3, Q_4, S_1, S_2, S_3$, and $S_4$ are processed to generate $U_0 \sim U_7$, and $U_0 \sim U_7$ are processed to generate $Z_0 \sim Z_7$. The generated $Z_0 \sim Z_7$ are further operated with $Y_0 \sim Y_7$. Additionally, the result of "$C_0 \cdot X_n$"~"$C_6 \cdot X_n$" (where $0 \leq n \leq 7$) can be calculated using architectures shown in FIGS. 10-12.

Referring to FIGS. 5 and 9, 8-point and 4-point one-dimensional architectures comprise common operation units such that the 8-point one-dimensional architecture can be divided into two sets of 4-point one-dimensional architectures. Thus, such two conversions can be integrated to build an effective hardware platform using multiplexers, as shown in FIG. 1.

An embodiment of an integrated conversion apparatus selects a correct data path and conversion coefficients to implement block operations for 8×8, 8×4, 4×8, and 4×4-points.

With respect to an example of 8×8-point two-dimensional inverse conversion, 8-point one-dimensional column conversion for 8 times is first performed and then 8-point two-dimensional row conversion for 8 times, completing the 8×8-point two-dimensional inverse conversion.

With respect to an example of 8×4-point two-dimensional inverse conversion, 8-point one-dimensional column conversion for 8 times is first performed and then two sets of 4-point two-dimensional row conversion for 8 times, completing the 8×4-point two-dimensional inverse conversion.

With respect to an example of 4×8-point two-dimensional inverse conversion, two sets of 4-point one-dimensional column conversion for 8 times are first performed and then 8-point two-dimensional row conversion for 8 times, completing two sets of the 4×8-point two-dimensional inverse conversion.

With respect to an example of 4×4-point two-dimensional inverse conversion, four sets of 4-point one-dimensional column conversion for 4 times are first performed and then four sets of 4-point two-dimensional row conversion for 4 times, completing two sets of the 4×4-point two-dimensional inverse conversion. Thus, the described two-dimensional inverse conversions for different block sizes (8×8, 8×4, 4×8, and 4×4-point) can be achieved using the integrated conversion apparatus.

Figure 2:
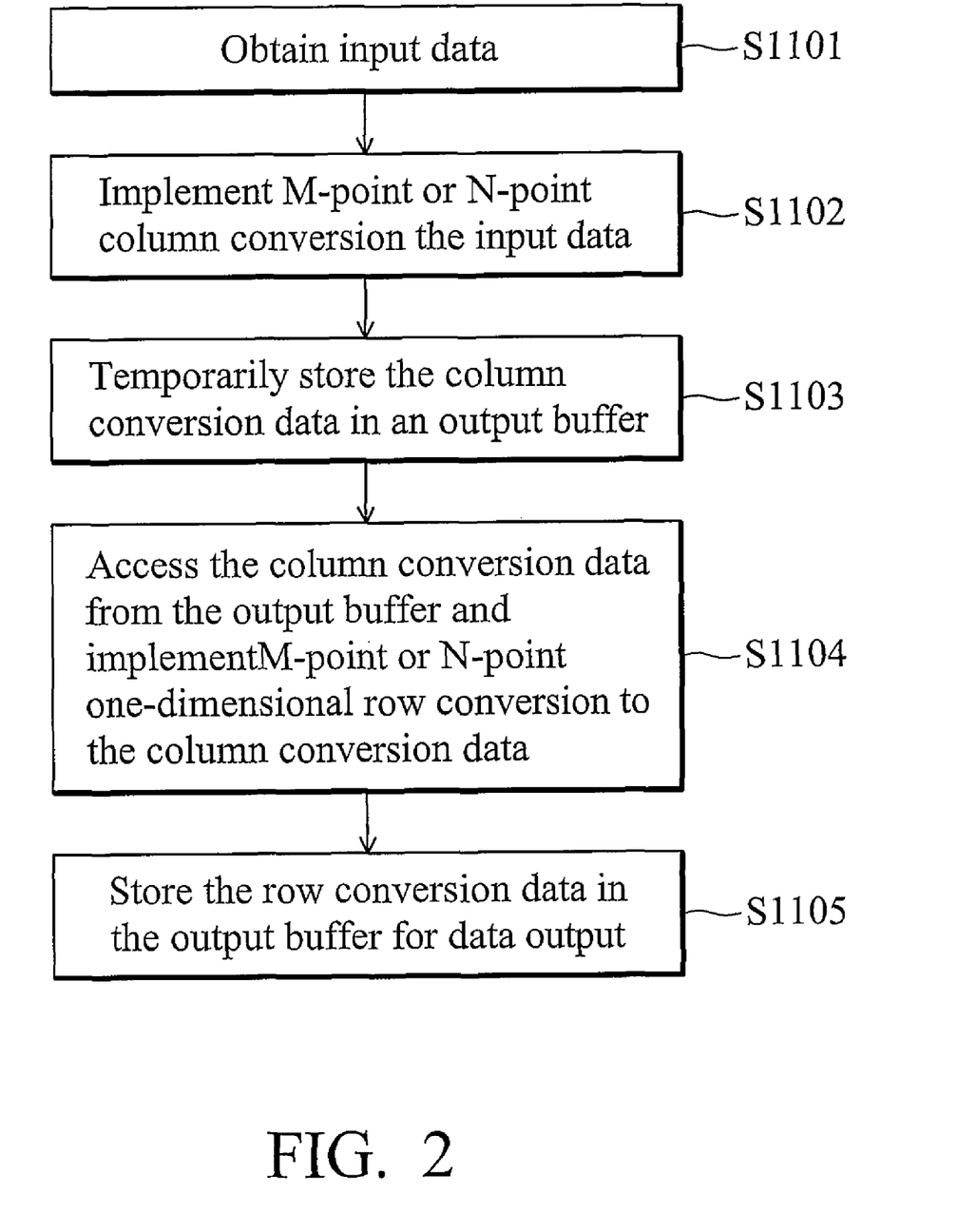
FIG. 2 is a flowchart of an embodiment of an integrated conversion method.

FIG. 2 is a flowchart of an embodiment of an integrated conversion method.

Input data is first obtained using a multiplexer and transmitted to a conversion unit (the 8-point or 4-point conversion unit as described, for example) (step S1101). Column conversion with M-point or N-point is implemented on the input data using the conversion unit (step S102), where M=8 and N=4 in this embodiment, but is not intended to be limitative. The column conversion data is temporarily stored in an output buffer (step S1103). Next, the conversion unit accesses the column conversion data from the output buffer and implements M-point or N-point one-dimensional row conversion on the column conversion data (step S1104) and stores the row conversion data in the output buffer for data output (step S1105).

Figure 3A:
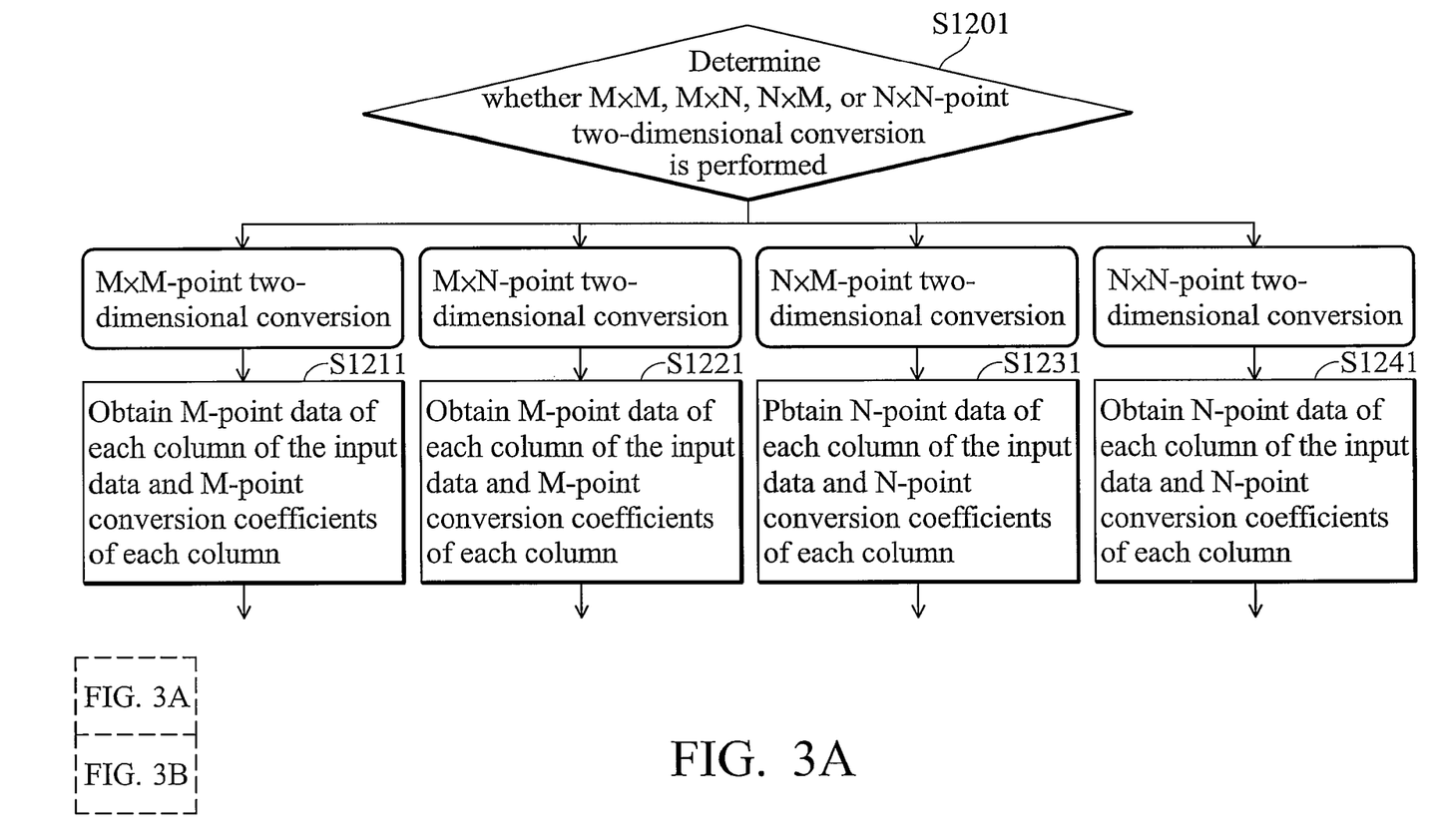
FIGS. 3A and 3B show a detailed flowchart of an integrated conversion method shown in FIG. 2.
Figure 3B:
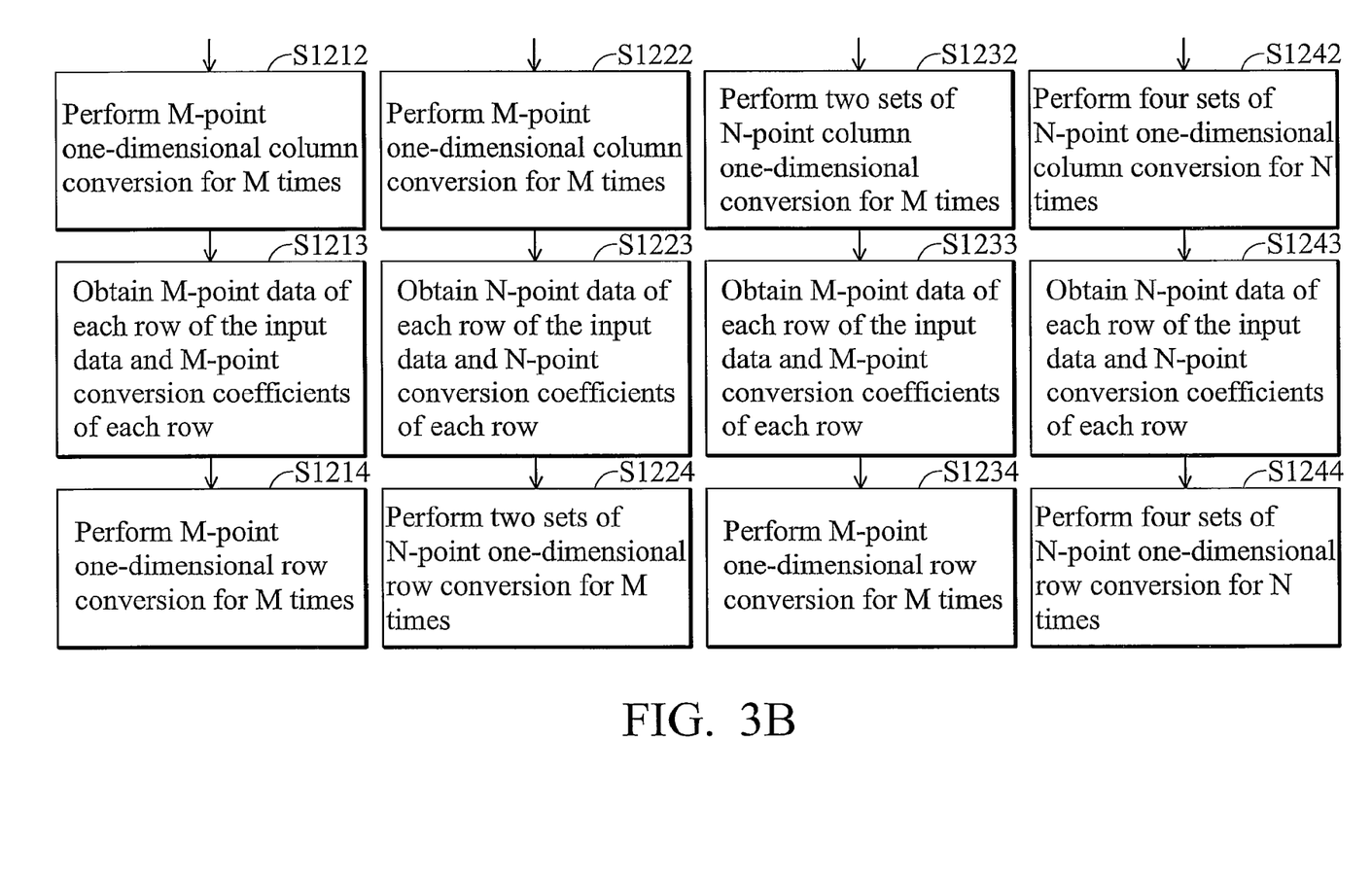

FIGS. 3A and 3B show a detailed flowchart of an integrated conversion method shown in FIG. 2.

It is determined whether M×M, M×N, N×M, or N×N-point two-dimensional conversion is performed (step S1201), where M=8 and N=4 in this embodiment, but is not intended to be limitative. If the M×M-point two-dimensional conversion is performed, M-point data of each column of the input data is obtained using a first multiplexer, M-point conversion coefficients of each column is obtained using a second multiplexer (step S1211), and M-point one-dimensional column conversion for M times is performed using a first conversion unit (step S1212). Next, M-point data of each row of the input data is obtained using the first multiplexer and M-point conversion coefficients of each row is obtained using the second multiplexer (step S1213), and M-point one-dimensional row conversion for M times is performed using the first conversion unit (step S1214).

If the M×N-point two-dimensional conversion is performed, M-point data of each column of the input data is obtained using the first multiplexer and M-point conversion coefficients of each column is obtained using the second multiplexer (step S1221). M-point one-dimensional column conversion for M times is performed using the first conversion unit (step S1222). Next, N-point data of each row of the input data is obtained using the first multiplexer and N-point conversion coefficients of each row is obtained using the second multiplexer (step S1223), and two sets of N-point one-dimensional row conversion for M times are performed using a second conversion unit.

If the N×M-point two-dimensional conversion is performed, N-point data of each column of the input data is obtained using the first multiplexer and N-point conversion coefficients of each column is obtained using the second multiplexer (step S1231). Two sets of N-point one-dimensional column conversion for M times are performed using the second conversion unit (step S1232). M-point data of each row of the input data is obtained using the first multiplexer and M-point conversion coefficients of each row is obtained using the second multiplexer (step S1233), and M-point one-dimensional row conversion for M times is performed using the first conversion unit (step S1234).

If the N×M-point two-dimensional conversion is performed, N-point data of each column of the input data is obtained using the first multiplexer and N-point conversion coefficients of each column are obtained using the second multiplexer (step S1241). Four sets of N-point one-dimensional column conversion for N times are performed using the second conversion unit (step S1242). N-point data of each row of the input data is obtained using the first multiplexer and N-point conversion coefficients of each row are obtained using the second multiplexer (step S1243), and four sets of N-point one-dimensional row conversion for N times are performed using the first conversion unit (step S1244).

It is noted that, in this embodiment, the method and apparatus processes data via a selected 8-point or 4-point conversion unit selected using a first multiplexer, selects conversion coefficients, and reads and writes conversion data stored in the output buffer using a second multiplexer, but is not further described for brevity. Additionally, matrix data is concurrently input and output to obtain 8-point or 4-point matrix data.

Methods and systems of the present invention, or certain aspects or portions of embodiments thereof, may take the form of program code (i.e., instructions) embodied in media, such as floppy diskettes, CD-ROMS, hard drives, firmware, or any other machine-readable storage medium, wherein, when the program code is loaded into and executed by a machine, such as a computer, the machine becomes an apparatus for practicing embodiments of the disclosure. The methods and apparatus of the present invention may also be embodied in the form of program code transmitted over some transmission medium, such as electrical wiring or cabling, through fiber optics, or via any other form of transmission, wherein, when the program code is received and loaded into and executed by a machine, such as a computer, the machine becomes an apparatus for practicing and embodiment of the disclosure. When implemented on a general-purpose processor, the program code combines with the processor to provide a unique apparatus that operates analogously to specific logic circuits.

While the invention has been described by way of example and in terms of the preferred embodiments, it is to be understood that the invention is not limited to the disclosed embodiments. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. An integrated conversion method, comprising:
   obtaining row or column point data of a multi-dimensional matrix by a first multiplexer;
   obtaining input data and transmitting the input data to a conversion unit by the first multiplexer;
   obtaining conversion coefficients corresponding to the point data by a second multiplexer;
   implementing a M-point or N-point column conversion on the input data according to the conversion coefficients and the point data by the conversion unit;
   temporarily storing the column converted data into an output buffer by the conversion unit;
   accessing the column converted data from the output buffer by the first multiplexer;
   implementing a M-point or N-point row conversion on the column converted data by the conversion unit; and
   storing the row converted data into the output buffer for data output by the conversion unit.

2. The integrated conversion method as claimed in claim 1, wherein the multi-dimensional matrix is a M×M, M×N, N×M, or N×N-point multi-dimensional matrix.

3. The integrated conversion method as claimed in claim 1, further comprising implementing M-point or N-point one-dimensional column conversion on the input data using the conversion unit.

4. The integrated conversion method as claimed in claim 1, further comprising obtaining the M-point or N-point matrix data by parallel input and output.

5. The integrated conversion method as claimed in claim 1, further comprising:
   determining whether M×M, M×N, N×M, or N×N-point two-dimensional conversion is performed;
   if the M×M-point two-dimensional conversion is performed, obtaining M-point data of each column of the input data using a first multiplexer and obtaining M-point conversion coefficients of each column using a second multiplexer;
   performing M-point one-dimensional column conversion for M times using a first conversion unit;
   obtaining M-point data of each row of the input data using the first multiplexer and obtaining M-point conversion coefficients of each row using the second multiplexer; and
   performing M-point one-dimensional row conversion for M times using the first conversion unit.

6. The integrated conversion method as claimed in claim 5, further comprising:
   if the M×N-point two-dimensional conversion is performed, obtaining M-point data of each column of the input data using the first multiplexer and obtaining M-point conversion coefficients of each column using the second multiplexer;
   performing M-point one-dimensional column conversion for M times using the first conversion unit;

obtaining N-point data of each row of the input data using the first multiplexer and obtaining N-point conversion coefficients of each row using the second multiplexer; and performing two sets of N-point one-dimensional row conversion for M times using a second conversion unit.

7. The integrated conversion method as claimed in claim 6, further comprising:

if the N×M-point two-dimensional conversion is performed, obtaining N-point data of each column of the input data using the first multiplexer and obtaining N-point conversion coefficients of each column using the second multiplexer;

performing two sets of N-point one-dimensional column conversion for M times using the second conversion unit;

obtaining M-point data of each row of the input data using the first multiplexer and obtaining M-point conversion coefficients of each row using the second multiplexer; and performing M-point one-dimensional row conversion for M times using the first conversion unit.

8. The integrated conversion method as claimed in claim 7, further comprising:

if the N×M-point two-dimensional conversion is performed, obtaining N-point data of each column of the input data using the first multiplexer and obtaining N-point conversion coefficients of each column using the second multiplexer;

performing four sets of N-point one-dimensional column conversion for N times using the second conversion unit;

obtaining N-point data of each row of the input data using the first multiplexer and obtaining N-point conversion coefficients of each row using the second multiplexer; and performing four sets of N-point one-dimensional row conversion for N times using the first conversion unit.

9. The integrated conversion method as claimed in claim 8, further comprising processing the conversion data using the first or the second conversion unit selected by the first multiplexer.

10. The integrated conversion method as claimed in claim 9, further comprising reading and writing the conversion data stored in the output buffer using the second multiplexer.

11. An integrated conversion apparatus, comprising:
an output buffer;
a first multiplexer, obtaining row or column point data of a multi-dimensional matrix and input data;
a second multiplexer, obtaining conversion coefficients corresponding to the point data; and
a conversion unit, receiving the input data and the conversion coefficients from the first and second multiplexer respectively, performing a M-point or N-point column conversion on the input data according to the point data and conversion coefficients, storing the column converted data temporarily into the output buffer, accessing the column converted data by the first multiplexer, performing a M-point or N-point row conversion on the column converted data received by the first multiplexer, and storing the row converted data into the output buffer for data output.

12. The integrated conversion apparatus as claimed in claim 11, wherein the multi-dimensional matrix is a M×M, M×N, N×M, or N×N-point multi-dimensional matrix.

13. The integrated conversion apparatus as claimed in claim 11, wherein the conversion unit further implements M-point or N-point one-dimensional column conversion on the input data.

14. The integrated conversion apparatus as claimed in claim 11, wherein the first multiplexer further obtains the M-point or N-point matrix data by parallel input and output.

15. The integrated conversion apparatus as claimed in claim 11, wherein the conversion unit further comprises a first conversion unit, wherein the first multiplexer determines whether M×M, M×N, N×M, or N×N-point two-dimensional conversion is performed, and, if the M×M-point two-dimensional conversion is performed, obtains M-point data of each column of the input data, the second multiplexer obtains M-point conversion coefficients of each column, the first conversion unit performs M-point one-dimensional column conversion for M times, the first multiplexer obtains M-point data of each row of the input data, the second multiplexer obtains M-point conversion coefficients of each row; and the first conversion unit performs M-point one-dimensional row conversion for M times.

16. The integrated conversion apparatus as claimed in claim 15, wherein the conversion unit further comprises a second conversion unit, wherein the first multiplexer obtains M-point data of each column of the input data if the M×N-point two-dimensional conversion is performed, the second multiplexer obtains M-point conversion coefficients of each column, the first conversion unit performs M-point one-dimensional column conversion for M times, the first multiplexer obtains N-point data of each row of the input data, the second multiplexer obtains N-point conversion coefficients of each row, and the second conversion unit performs two sets of N-point one-dimensional row conversion for M times.

17. The integrated conversion apparatus as claimed in claim 16, wherein the first multiplexer obtains N-point data of each column of the input data if the N×M-point two-dimensional conversion is performed, the second multiplexer obtains N-point conversion coefficients of each column using, the second conversion unit performs two sets of N-point one-dimensional column conversion for M times, the first multiplexer obtains M-point data of each row of the input data, the second multiplexer obtains M-point conversion coefficients of each row, and the first conversion unit performs M-point one-dimensional row conversion for M times.

18. The integrated conversion apparatus as claimed in claim 17, wherein the first multiplexer obtains N-point data of each column of the input data if the N×M-point two-dimensional conversion is performed, the second multiplexer obtains N-point conversion coefficients of each column, the second conversion unit performs four sets of N-point one-dimensional column conversion for N times, the first multiplexer obtains N-point data of each row of the input data using the second multiplexer obtains N-point conversion coefficients of each row, and the first conversion unit performs four sets of N-point one-dimensional row conversion for N times.

19. The integrated conversion apparatus as claimed in claim 18, wherein the first multiplexer further selects the first or second conversion unit to process the conversion data.

20. The integrated conversion apparatus as claimed in claim 19, wherein the second multiplexer further reads and writes the conversion data stored in the output buffer.

* * * * *